UNITED STATES PATENT OFFICE.

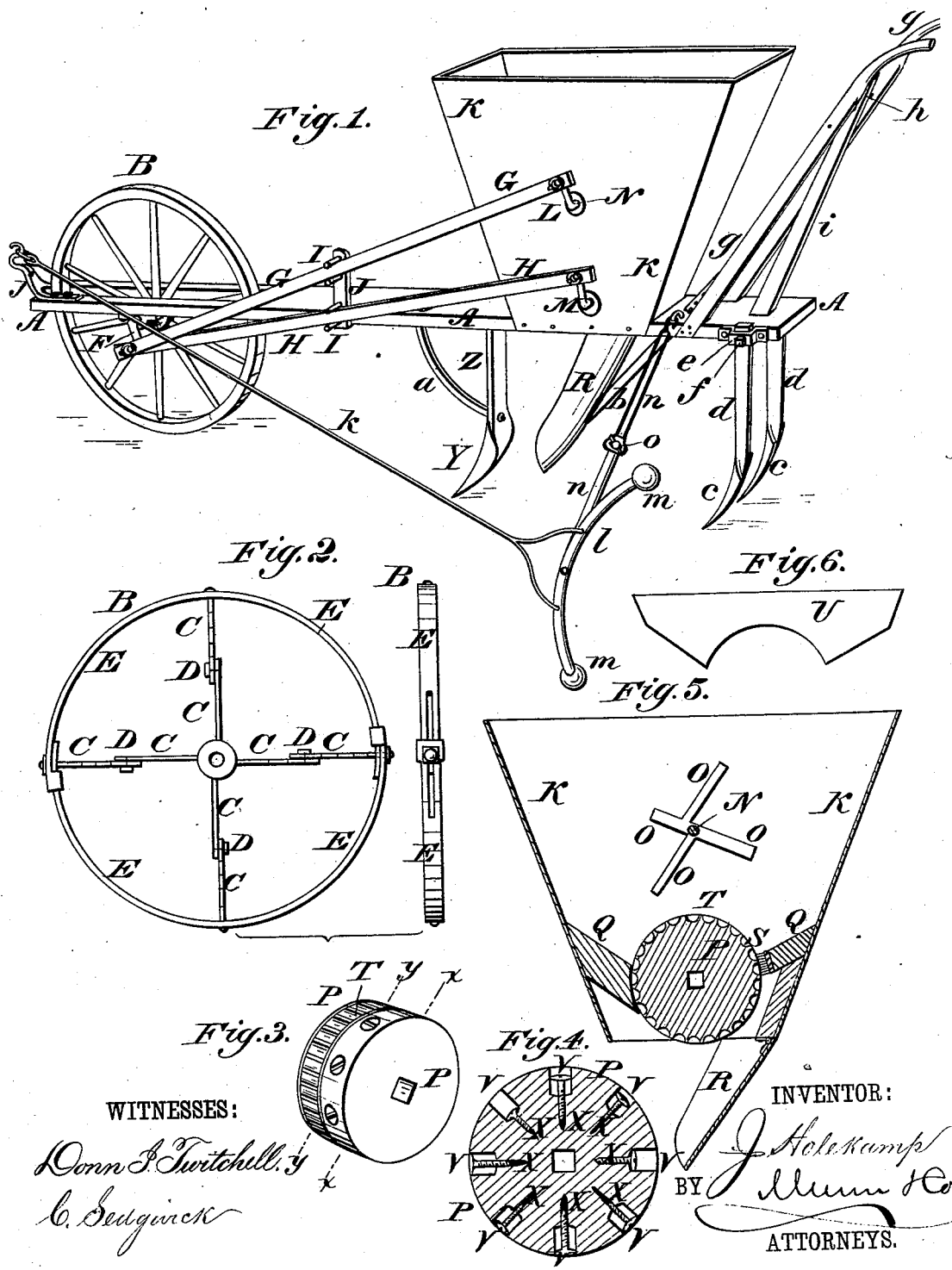

JULIUS HOLEKAMP, OF COMFORT, TEXAS.

SEED-PLANTER.

SPECIFICATION forming part of Letters Patent No. 236,223, dated January 4, 1881.

Application filed August 6, 1880. (No model.)

*To all whom it may concern:*

Be it known that I, JULIUS HOLEKAMP, of Comfort, in the county of Kendall and State of Texas, have invented a new and useful Improvement in Seed-Planters, of which the following is a specification.

Figure 1 is a perspective view of the improvement. Fig. 2 is a side and a front elevation of an extension drive-wheel. Fig. 3 is a perspective view of the seed-dropping cylinder. Fig. 4 is a sectional end elevation of the seed-dropping cylinder, taken through the line $x\,x$, Fig. 3. Fig. 5 is a sectional elevation of the seed-hopper, the seed-dropping cylinder being shown in section, through the line $y\,y$, Fig. 3. Fig. 6 represents a cover for the cotton-planting part of the cylinder.

Similar letters of reference indicate corresponding parts.

The object of this invention is to furnish seed-planters for planting in hills or drills corn, sorghum, beans, rice, cotton, and other seeds, so constructed that the seed may be planted in any desired quantity, and at any desired distance apart, and with the rows at any desired distance apart.

A represents a board or plank which forms the frame of the planter, and which has its forward end slotted to receive the drive-wheel B.

The drive-wheel B may be an ordinary wheel, as shown in Fig. 1, or it may be an extension-wheel, as shown in Fig. 2. The latter construction I prefer, as it enables the distance apart of the hills to be regulated by varying the size of the wheel.

In the drive-wheel shown in Fig. 2 each spoke C is made in two parts, with their adjacent ends overlapping each other and fastened together by a bolt, D, which passes through a longitudinal slot in the outer part of the spoke, and screws into a screw-hole in the inner part of the spoke, so that the spoke can be lengthened and shortened, as desired, by loosening the bolt D.

The rim E is made in two parts, the ends of which overlap each other and are slotted longitudinally to receive tenons formed upon the ends of the two spokes C, opposite the said overlapped ends of the rim, which tenons have washers attached to them upon the outer side of the rim, so that the said rim can be lengthened and shortened as the spokes C are lengthened and shortened. The outer ends of the rim E have keepers or clasps attached to them, to receive the edges of the parts of the rim beneath them, and thus hold the said outer ends down. The ends of the other two spokes C are riveted to the parts of the rim E.

The journals of the drive-wheel B revolve in bearings attached to the slotted forward part of the frame A, and upon one of the said journals is formed, or to it is attached, a crank, F, the crank-pin of which is made of sufficient length to receive the ends of two connecting-bars, G H. Each of the connecting-bars G H passes between two pins, I, attached, the one pair to the upper part, and the other pair to the lower part, of a standard, J, the lower end of which is bent inward and bolted to the frame A, so that the said pairs of pins I will serve as fulcrums to the said bars G H. The rear ends of the bars G H extend back to the seed-hopper K, attached to the rear part of the frame A, and are pivoted to the cranks L M.

The crank L is formed upon or attached to the journal of the stirrer-shaft N, which is pivoted to the middle parts of the sides of the hopper K, and has a bar, O, with four or more arms attached to its middle part, so as to keep the seed stirred up and fed down to the seed-dropping cylinder P.

The crank M is formed upon or attached to the journal of the seed-dropping cylinder P, which is pivoted in the lower part of the seed-hopper K, with its upper side projecting through a slot or opening in the bottom Q of the said seed-hopper K, so as to receive the seed from the said hopper and drop it into the spout R, by which it is conducted to the ground.

The dropping-cylinder P is kept from carrying out any more seed than enough to fill its seed-dropping recesses by a cut-off brush, S, attached to the rear part of the hopper-bottom Q. The cranks L M are arranged in the same direction when the connecting-bars G H are attached to them, so that the upper part of the seed-dropping cylinder P and the lower part of the stirrer O will always be moving in opposite directions, which causes the said stirrer to force the seed into the seed-dropping recesses of the said cylinder P, and thus insures the proper filling of the said recesses.

Around one end of the seed-dropping cylinder P is formed a circle of recesses, T, to receive cotton-seeds and drop them into the spout R. When the machine is to be used for planting other than cotton-seeds the part of the cylinder P in which the recesses T are formed is covered with a cover, U, the lower side of which is concaved to fit upon the said cylinder, and its end parts are so formed as to fit upon the bottom Q and against the inclined front and rear sides of the hopper K. The stirrer O is used only when cotton-seed is to be planted, and is detached when the machine is to be used for planting other kinds of seeds. In the other part of the cylinder P are formed eight round recesses, V, at equal distances apart, for planting corn, beans, and other seeds.

In the bottom of each of the holes V is placed a screw, X, which may be turned in and out to regulate the quantity of seed to be dropped at a time, and may be turned far enough to entirely close the said recesses V, so that the distance apart of the hills may also be regulated by closing some of the said recesses, care being taken to leave the open recesses at equal distances apart.

The furrow is opened to receive the seed by a plow, Y, the standard Z of which is attached to the frame A beneath the forward part of the hopper K.

The standard Z is strengthened against the draft-strain by a brace, a, attached at one end to the lower part of the said standard and at its upper end to the frame A.

The conductor-spout R is hinged at its upper end to the frame A, or is otherwise adjustably attached to the frame A, so that its lower end can be adjusted close to the opening-plow Y when it is desired to drop the seed in the bottom of the furrow opened by the said plow before the furrow has been partially filled by the falling in of the soil. The spout R is held in place, when adjusted, by a brace-bar, b, attached to it, and which passes up through a hole in the frame A, in the rear of the hopper K, and has a number of holes formed in it to receive the pin or pins by which it is secured in place when adjusted.

The furrow is filled and the seed is covered by two plows, c, the standards d of which pass up through keepers e attached to the sides of the frame A, and are secured in place by set-screws f passing through the said keepers and resting against the said standards.

To the sides of the rear part of the frame A are attached the lower ends of the handles g, the upper parts of which are connected by a round, h. The handles g are strengthened in position by the standard i, the lower end of which is attached to the rear end of the frame A, and its upper end is attached to the round h.

To the forward end of the frame A is attached an arm, j, which may serve as a draft-hook, and to the upper end of which is pivoted the forward end of a long rod, k. The rear end of the rod k is forked, and is attached to the middle part of the curved bar l, which has a plow or other marker, m, attached to each end.

To the center of the bar l is pivoted the outer end of a rod, n, the inner end of which is pivoted to the frame A in the rear of the hopper K, so that it can be turned down at either side of the planter. The rod n is made in two parts, overlapping each other, or the one tubular, to receive the other, and which are secured to each other by a set-screw, o. The rod n is adjusted to a length equal to the desired distance apart of the rows, and is turned down upon the side of the machine opposite the rows last planted, to serve as a guide to the plowman in the next crossing.

When the machine is turned at the end of a row the marker is swung over the machine and dropped to the ground at the other side, so as to again make a mark. The curvature of the bar l causes the marker to pass over stones and other obstructions without catching upon them.

I am aware that it is not broadly new to swing a marker from side to side, or to make a seeder drive-wheel expansible and contractible for increasing or diminishing its size; but

What I claim is—

1. In a seed-planter, the curved bar l, having a ball, m, at each end, and attached rigidly in the middle to a front pivoted fork-rod, k, in combination with a pivoted spacing-rod, n, made in two parts, adjustable on one another, as and for the purpose specified.

2. In a seed-planter, the drive-wheel B, having a rim in two end-slotted parts, E E, lapping only at the ends, and four two-part spokes whose parts are adjustable on each other, as shown and described.

JULIUS HOLEKAMP.

Witnesses:
OTTO BRINKMANN,
WILLIAM H. MITCHELL.